(12) United States Patent
Okano

(10) Patent No.: US 10,670,944 B2
(45) Date of Patent: Jun. 2, 2020

(54) LIGHTING DEVICE REFLECTING PART OF IRRADIATION LIGHT AND IMAGE PICKUP APPARATUS USING LIGHTING DEVICE

(71) Applicant: CANON KABUSHIKI KAISHA, Tokyo (JP)

(72) Inventor: Yoshinobu Okano, Shiraoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/245,346

(22) Filed: Jan. 11, 2019

(65) Prior Publication Data

US 2019/0219896 A1 Jul. 18, 2019

(30) Foreign Application Priority Data

Jan. 15, 2018 (JP) .................. 2018-004351

(51) Int. Cl.
*G03B 15/05* (2006.01)
*H04N 5/225* (2006.01)

(52) U.S. Cl.
CPC .......... *G03B 15/05* (2013.01); *H04N 5/2256* (2013.01); *G03B 2215/051* (2013.01); *G03B 2215/0528* (2013.01)

(58) Field of Classification Search
USPC ....................................................... 396/155
See application file for complete search history.

(56) References Cited

U.S. PATENT DOCUMENTS

| 5,300,964 A | * | 4/1994 | Kobayashi | ............... A61B 3/14 351/206 |
| 2009/0231856 A1 | * | 9/2009 | Householder | ......... F21V 7/0025 362/304 |
| 2013/0176482 A1 | * | 7/2013 | Hirasawa | ................. G03B 7/16 348/370 |
| 2017/0219196 A1 | * | 8/2017 | Okano | ................... G03B 15/05 |

FOREIGN PATENT DOCUMENTS

JP H062345 U 1/1994

* cited by examiner

*Primary Examiner* — Clayton E. LaBalle
*Assistant Examiner* — Warren K Fenwick
(74) *Attorney, Agent, or Firm* — Rossi, Kimms & McDowell LLP

(57) ABSTRACT

A lighting device that is capable of retracting a reflective member inside a lighting device and of deciding size of the reflective member irrespective of the size of the lighting device. The lighting device includes a light emitting section and a reflective member. The reflective member is drawably retracted in the light emitting section and is provided with reflectors that are developed by a drawing operation to reflect a part of light irradiated from the light emitting section. Area of the reflectors in a developed state is more than area of the reflectors in a retracted state.

10 Claims, 10 Drawing Sheets

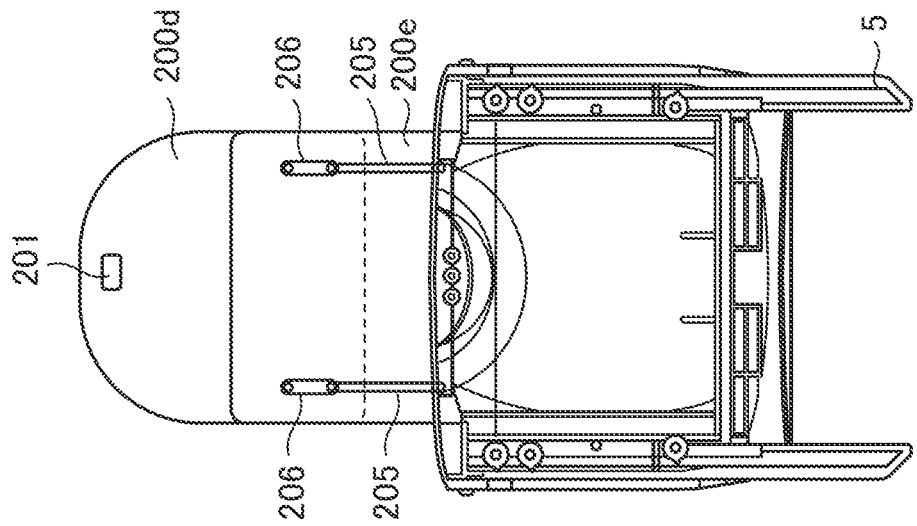
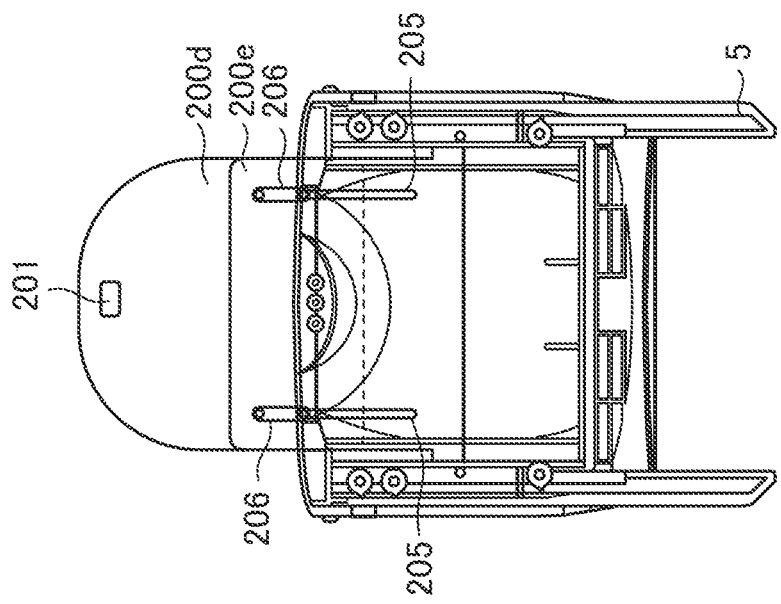
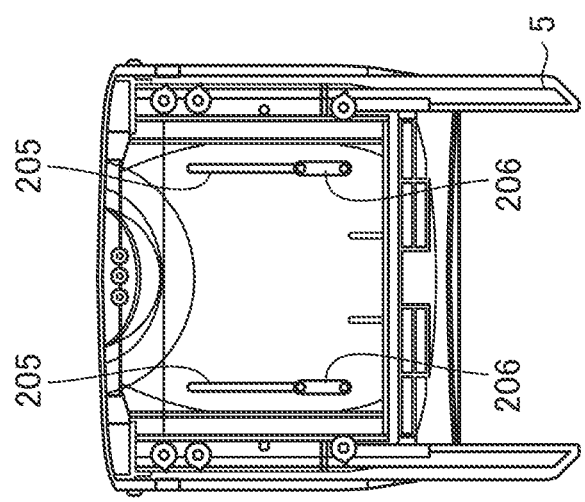

LIGHTING DEVICE REFLECTING PART OF IRRADIATION LIGHT AND IMAGE PICKUP APPARATUS USING LIGHTING DEVICE

BACKGROUND OF THE INVENTION

Field of the Invention

The present invention relates to a lighting device like an electronic flash device that is provided in an image pickup apparatus like a digital camera, and particularly, relates to a lighting device having a reflective member that reflects a part of irradiation light and to the image pickup apparatus using the lighting device.

Description of the Related Art

There is a method of bounce photography to irradiate peripheral wall and ceiling with irradiation light from a lighting device like an electronic flash device and to photograph using reflected light. In the bounce photography, since the irradiation light does not enter into eyes of a person who is an object directly, a picture having facial expression with lively eyes may not be obtained. In order to avoid this, there is a method called catch light photographing that reflects a part of the irradiation light from the electronic flash device using a reflective member to irradiate the object.

For example, Japanese Unexamined Utility Model Application Publication No. H6-2345 (JP H6-2345U) suggests an electronic flash device that is provided with a reflective member that is retractable inside the device and will be drawn so as to be parallel to an irradiation direction by following a drawing operation of an irradiation angle conversion adaptor that changes an irradiation range of flash light. In this suggestion, a part of the light emitted from the electronic flash device and is reflected by the reflective member irradiates the object.

However, since the reflective member is retractable inside the electronic flash device disclosed in the above-mentioned publication, the size of the reflective member is restricted by the size of the electronic flash device, the effect of the catch light photographing is also restricted.

SUMMARY OF THE INVENTION

The present invention provides a lighting device that is able to retract the reflective member inside the lighting device and to decide the size of the reflective member irrespective of the size of the lighting device. Further, the present invention provides an image pickup apparatus using the lighting device.

Accordingly, a first aspect of the present invention provides a lighting device including a light emitting section, and a reflective member that is drawably retracted in the light emitting section and is provided with reflectors that are developed by a drawing operation to reflect a part of light irradiated from the light emitting section so that area of the reflectors in a developed state will be more than area of the reflectors in a retracted state.

Accordingly, a second aspect of the present invention provides an image pickup apparatus including an image pickup unit configured to pick up an image of an object: and the lighting device of the first aspect.

Accordingly, a third aspect of the present invention provides A lighting device including a light emitting section, and a reflective member that has a first reflector and a second reflector that are retractable in a retraction part provided in the light emitting section and reflects a part of light irradiated from the light emitting section by the first reflector and the second reflector that have been drawn from the retraction part. The first reflector and the second reflector are retracted in the retraction part in a state where the first reflector at least partially overlaps with the second reflector. The second reflector is drawn from the retraction part in connection with shift movement of the first reflector in a direction in which the first reflector is drawn from the retraction part. Overlap area between the first reflector and the second reflector in a state where the first reflector and the second reflector have been drawn from the retraction part is smaller than the overlap area in a state where the first reflector and the second reflector are retracted in the retraction part.

According to the present invention, the lighting device that is able to retract the reflective member inside the lighting device and to decide the size of the reflective member irrespective of the size of the lighting device is provided.

Further features of the present invention will become apparent from the following description of exemplary embodiments with reference to the attached drawings.

BRIEF DESCRIPTION OF THE DRAWINGS

FIG. 10A, FIG. 10B, and FIG. 10C are upper plan views for describing retracting and drawing operations of a catch light sheet to the head part.

DESCRIPTION OF THE EMBODIMENTS

Figure 1A:
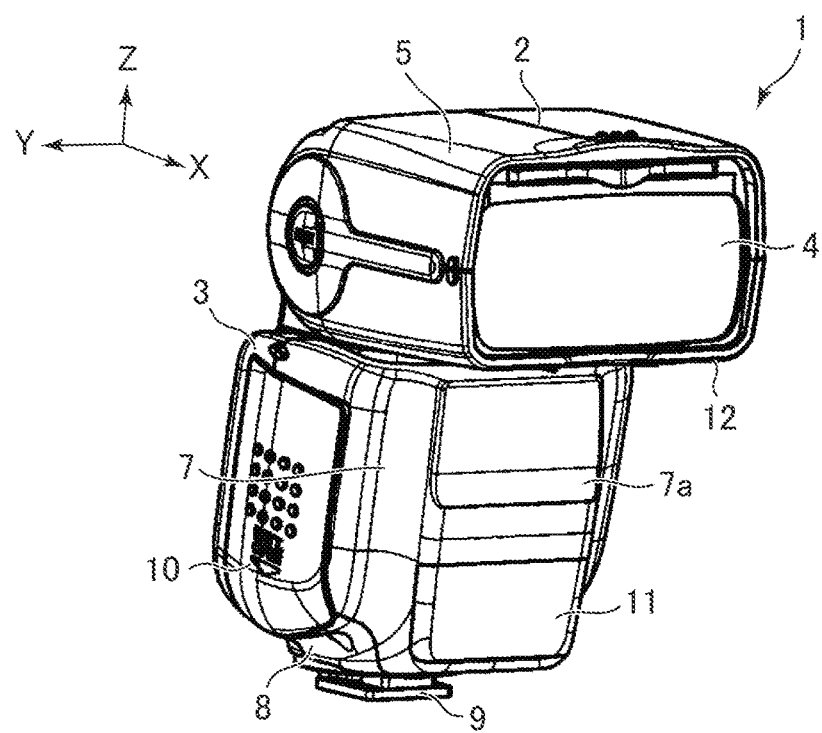
FIG. 1A and FIG. 1B are external perspective views showing an electronic flash device as a lighting device according to a first embodiment of the present invention viewed from a front side and a rear side, respectively.

Hereafter, embodiments according to the present invention will be described in detail by referring to the drawings.

Figure 1B:
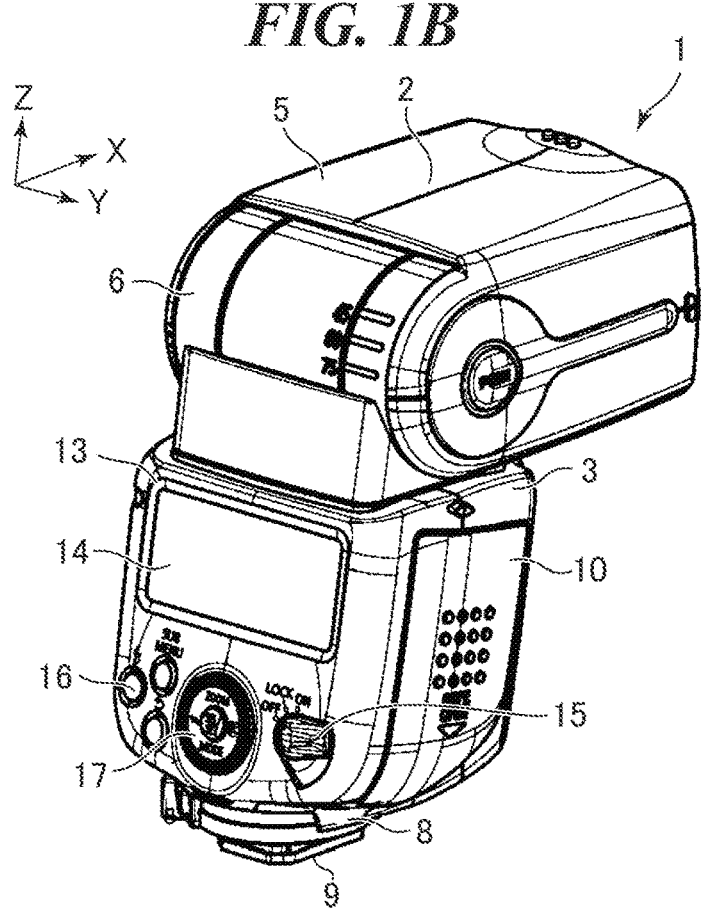

FIG. 1A is an external perspective view showing an electronic flash device 1 as a lighting device according to a first embodiment of the present invention viewed from a front side. FIG. 1B is an external perspective view showing the electronic flash device 1 shown in FIG. 1A viewed from a rear side.

As shown in FIG. 1A and FIG. 1B, the electronic flash device 1 in the first embodiment schematically consists of a head part (light emitting section) 2 positioned at an upper side and a control part 3 positioned at a lower side. The head part 2 is provided with a cylindrical xenon tube as a light source inside an optical panel 4 and has a bounce function that changes an irradiation direction of irradiation light from the optical panel 4 by a turning action. Moreover, the head part 2 is provided with a head upper cover 5, head lower cover 12, and cylindrical bounce case 6.

The head part 2 allows a relative rotation with respect to the control part 3 in a vertical direction (direction in a ZX plane). Moreover, the head part 2 allows a relative rotation with respect to the control part 3 in a horizontal direction (direction in an XY plane). Thus, the head part 2 is relatively rotatable with respect to the control part 3 and operates to change a light irradiation direction. The control part 3 supports the head part 2 and controls the action of the head part 2.

A rear cover 13 is provided in a rear side of the control part 3. Operation members, such as a display unit 14, a power switch 15, an operation button 16, a dial 17, are arranged on the rear cover 13 to set various functions. A battery lid 10 is a lid that is capable of opening and closing for loading a battery for a power source inside of the control part 3.

A leg 9, which is a connection part that will be detachably attached to an accessory shoe of a camera (not shown) as an image pickup apparatus, is provided in a bottom cover 8 covering the lower side of the control part 3. A front cover 7 is an exterior member at the front side of the control part 3. A bulge part 7a that is projected ahead is provided in the center of the front cover 7. In the lower half of the bulge part 7a, a window 11 for light pulse communication and for auxiliary light irradiation that assists focus detection of a camera under a low brightness condition is arranged.

In the first embodiment, the side at which the bulge part 7a of the control part 3 is provided is the front side, the side at which the display unit 14 and the operation members are provided is the rear side, and the side at which the leg 9 of the control part 3 is provided is the lower side. Then, an X-direction shown in FIG. 1A and FIG. 1B corresponds to the front-and-back direction of the control part 3, a Y-direction corresponds to a horizontal direction of the control part 3, and a Z-direction corresponds to a vertical direction of the control part 3. It should be noted that the front-and-back direction, horizontal direction, and vertical direction of the electronic flash device 1 are respectively identical to the front-and-back direction, horizontal direction, and vertical direction of the control part 3 as long as there is no different description. Although the electronic flash device that will be detachably attached to a camera is exemplified in the first embodiment, the present invention may be applied to an electronic flash device built in a camera. It should be noted that the camera is provided with an image pickup unit that takes an image of an object illuminated by the light emitting section 2.

Figure 2:
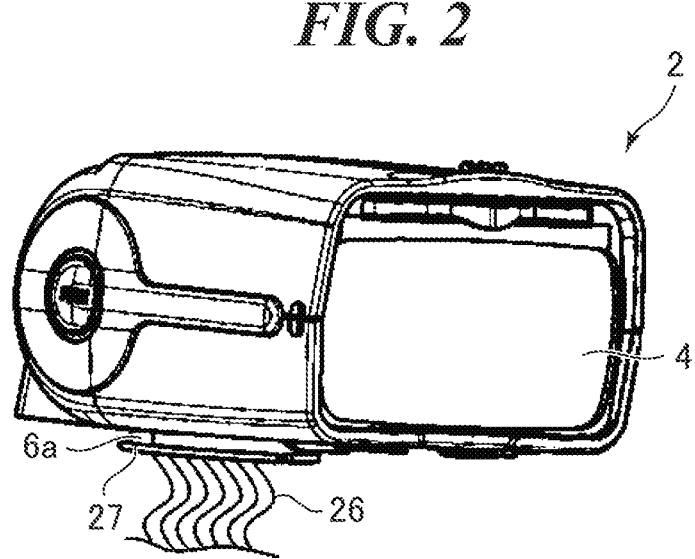
FIG. 2 is an exploded perspective view showing the electronic flash device viewed from the front side.
Figure 2:
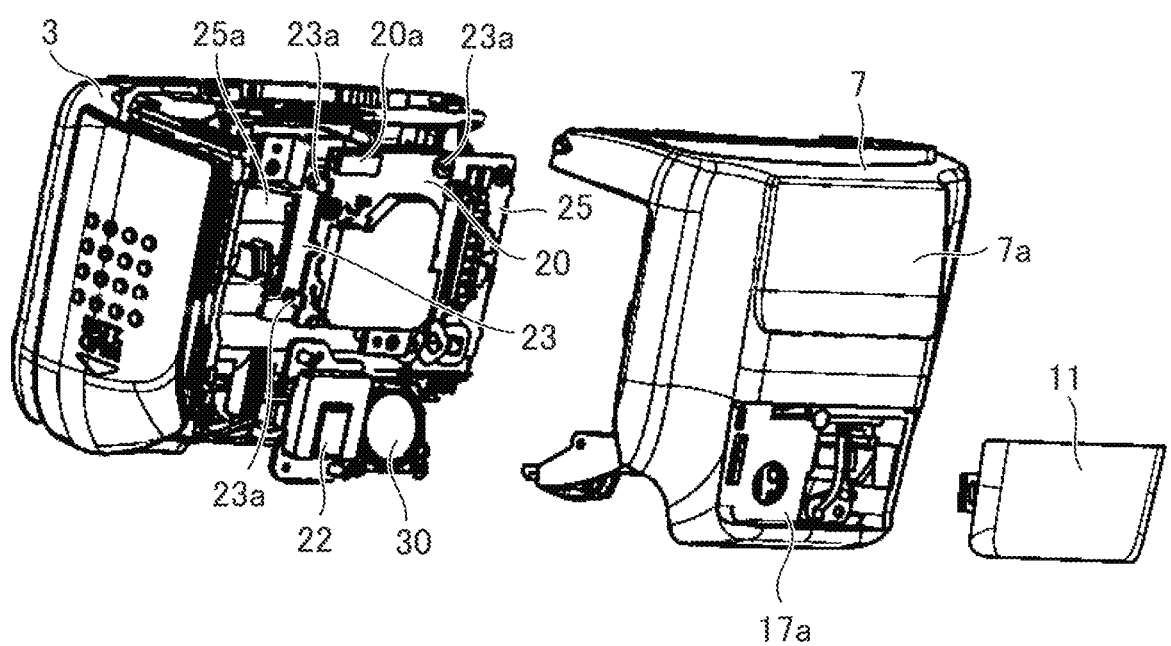
Figure 2:
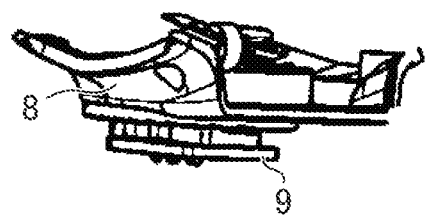
Figure 3:
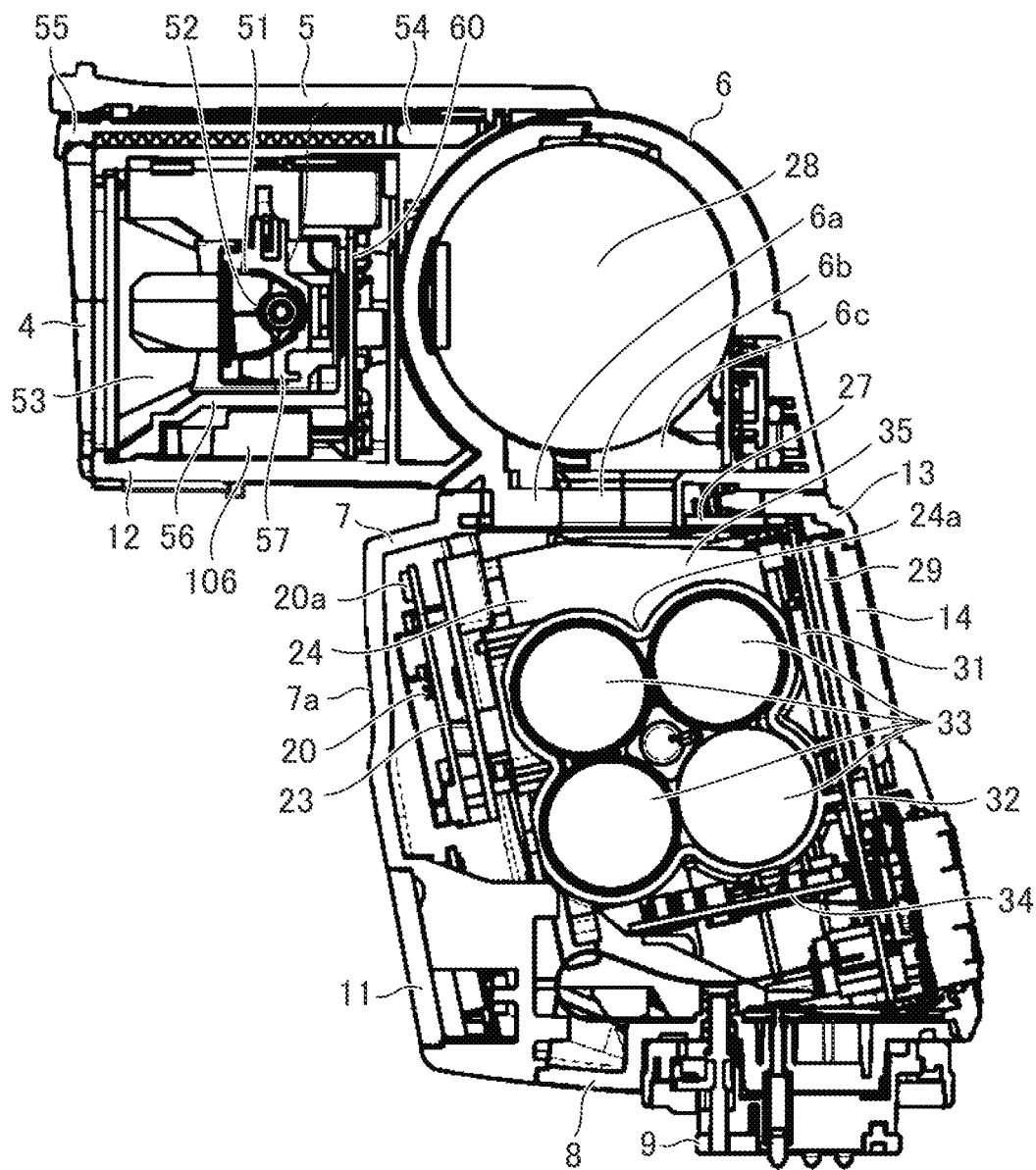
FIG. 3 is a sectional view showing a section of the electronic flash device that perpendicularly intersects with a horizontal direction.

Next, an internal configuration of the control part 3 will be described by referring to FIG. 2 and FIG. 3. FIG. 2 is an exploded perspective view showing the electronic flash device 1 viewed from the front side. FIG. 3 is a sectional view showing a section of the electronic flash device 1 that perpendicularly intersects with the horizontal direction.

As shown in FIG. 3, a battery case 24 is provided at a center of an internal space of the control part 3. Batteries 33 (four AA-sized batteries in the first embodiment) for a power source are stored in a battery holder 24a of the battery case 24 in an arrangement of an approximately quadrangular shape. Above the battery holder 24a, a predetermined spatial domain 35 is reserved between the battery holder 24a and a shaft 6a of the bounce case 6 protruded from the head part 2. The spatial domain 35 is provided in order to store a wire harness 26 in a loosened state. The wire harness 26 connects to a main substrate 32 and substrate 25 mentioned below (see FIG. 2).

If the wire harness 26 is connected in a stressful state without having a margin in length, the wire harness 26 will receive twist force by the right-and-left turn action of the head part 2 and may be disconnected. Accordingly, the wire harness 26 is stored in the spatial domain 35 with sufficient margin so as not to be subjected to influence of the right-and-left turn action.

The main substrate 32 equipped with a digital circuit is arranged at the rear side of the battery case 24 (i.e., the side of the rear cover 13). A CPU 31 is implemented in the main substrate 32. Moreover, switching devices corresponding to various kinds of the operation members like the power switch 15 arranged on the rear cover 13 are implemented in the main substrate 32.

A liquid crystal display (LCD) 29 is arranged inside the display unit 14. The substrate 25 (see FIG. 2) having a booster circuit provided with a booster transformer (not shown) and a substrate 34 having an emission control circuit equipped with a field-effect transistor (not shown) are attached to the front side and the lower side of the battery case 24, respectively.

As shown in FIG. 2, a pedestal 23 is attached to the front side of the battery case 24 so as not to overlap with the substrate 25. A wireless module 20 is attached to the front side of the pedestal 23 by a plurality of locking claws 23a integrally formed in the pedestal 23. A chip antenna 20a for wireless communications is implemented in a top end of the wireless module 20. Moreover, flexible substrate (not shown) connects a connector (not shown) of bottom end of the wireless module 20 to the main substrate 32.

Moreover, a photosensor 22 and a light projecting unit 30 are arranged in parallel at a position opposite to the window 11 provided in the lower part of the front cover 7. A prism is formed on the window 11 at a position opposite to the light projecting unit 30 in order to divide a single beam emitted from the light projecting unit 30 into a plurality of beams.

Figure 4A:
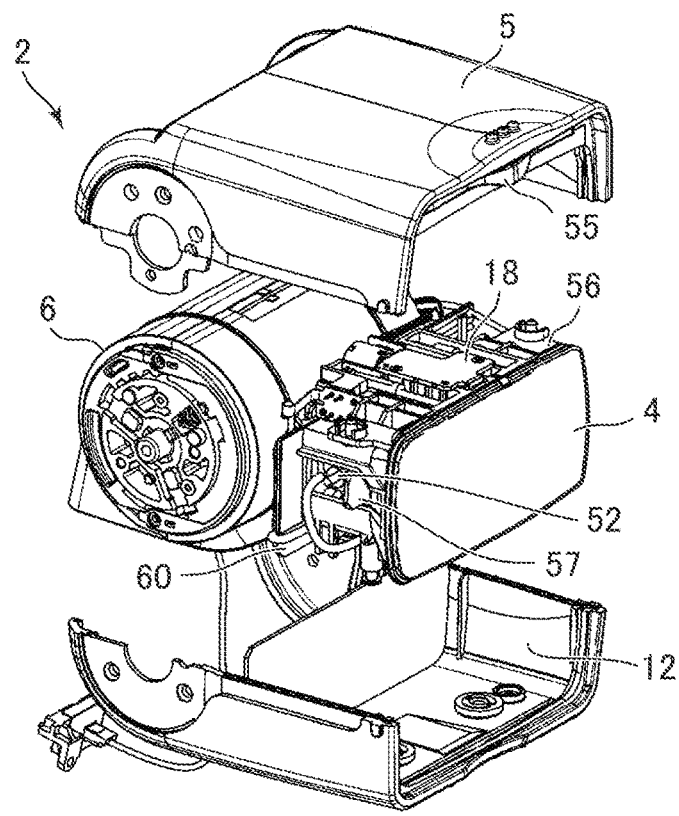
FIG. 4A and FIG. 4B are exploded perspective views showing a head part constituting the electronic flash device viewed from an upper side and a lower side, respectively.
Figure 4B:
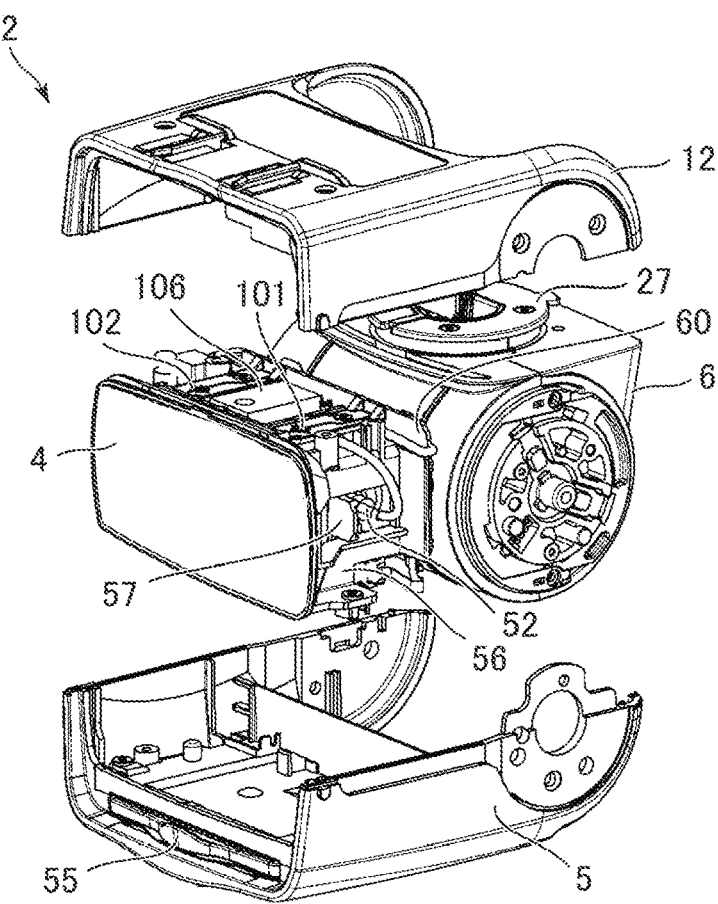
Figure 5:
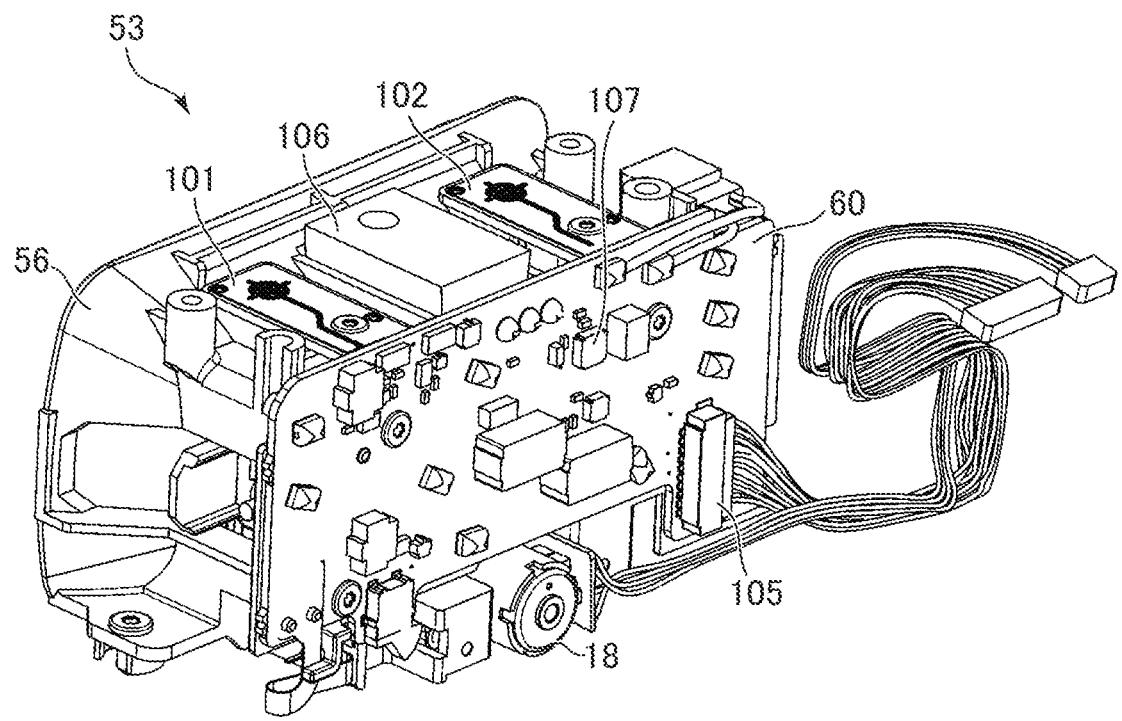
FIG. 5 is a perspective view showing a light emission unit constituting the electronic flash device viewed from the lower side.
Figure 6:
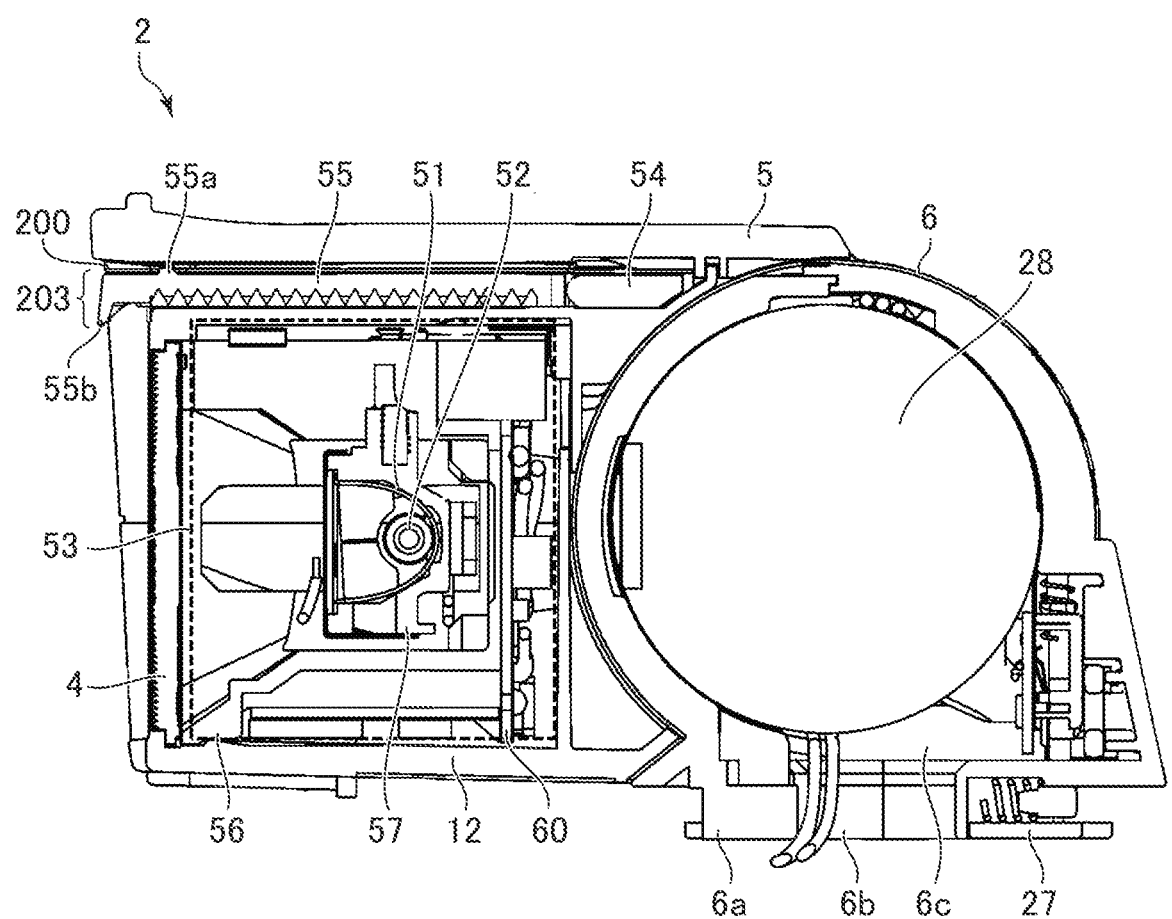
FIG. 6 is a sectional view showing a section of the head part that perpendicularly intersects with the horizontal direction.

Next, an internal configuration of the head part 2 will be described by referring to FIG. 3 through FIG. 6. FIG. 4A is an exploded perspective view showing the head part 2 viewed from the upper side. FIG. 4B is an exploded perspective view showing the head part 2 viewed from the lower side. FIG. 5 is a perspective view showing a light emission unit 53 viewed from the lower side. FIG. 6 is a sectional view showing a section of the head part 2 that perpendicularly intersects with the horizontal direction.

The electronic flash device 1 of the first embodiment has an electric zoom function that changes an irradiation angle by changing the relative distance between the optical panel 4 and a xenon tube 52 that is a light source. Most of an internal space of the head part 2 is occupied by a light emission unit 53 that constitutes the mechanism of the electric zoom function. A motor unit 18 equipped with a screw (not shown) is attached to a hood 56 that constitutes the light emission unit 53.

The xenon tube 52 that is a light source and a reflection umbrella 51 that reflects the light from the xenon tube 52 forward are attached to a reflection umbrella holder 57. The reflection umbrella holder 57 changes the relative distance between the optical panel 4 and the xenon tube 52 by interlocking with rotation of the screw. The light that is not reflected by the reflection umbrella 51 in the irradiation direction of the light emission unit 53 is reflected by the hood 56 in the irradiation direction of the light emission unit 53. Accordingly, the hood 56 is so shaped that an opening in a plane that perpendicularly intersects with an optical axis of the irradiation light of the light emission unit 53 increases as approaching the optical panel 4 in order to reflect the light to the irradiation direction of the light emission unit 53 efficiently.

As mentioned above, the hood 56 is a reflective member that surrounds the xenon tube 52 except the partial opening and reflects a part of light irradiated from the xenon tube 52 in the direction toward the opening. A head substrate 60 connected with the xenon tube 52 is attached to the rear side (the side of the bounce case 6) of the hood 56.

Next, the configuration of the head substrate 60 will be described. As shown in FIG. 4B and FIG. 5, a bounce adapter detection substrate 101 and color filter detection substrate 102 are arranged above the light emission unit 53, and these substrates are connected to the head substrate 60 by solder.

A circuit that accompanies the emission control, a connector 105, a trigger transistor (IGBT) 107, and a main transistor (IGBT) 106 are implemented in the head substrate 60. The main transistor (IGBT) 106 is implemented in a different surface of the head substrate 60 from the surface in which the trigger transistor (IGBT) is implemented. The connector 105 is collected and implemented at the side of the bounce case 6 and is connected with the above-mentioned wirings (not shown). The trigger transistor (IGBT) 107 controls to apply high voltage used as a trigger for emitting the xenon tube 52.

A capacitor (main capacitor) 28 is provided inside the cylindrical bounce case 6. The capacitor 28 is arranged on a rotation axis around which the head part 2 is relatively rotated with respect to the control part 3 in the vertical direction (Z direction). Moreover, the capacitor 28 is arranged near a below-mentioned connection part between the head part 2 and the control part 3, is stored in the head part 2, and accumulates electric charge for emitting the xenon tube 52. This charge accumulation generates the high voltage required for emitting the xenon tube 52. The shaft 6a for horizontal rotation (rotation in the XY plane) is formed on the bottom of the bounce case 6 that faces the control part 3.

Wirings (not shown) connected to the head substrate 60 are guided to a capacitor storage part 6c passing through a rotation section (not shown) between the head upper cover 5 that rotates around the cylinder center of the bounce case 6 and the bounce case 6. These wirings constitute the wire harness 26 together with the wirings connected to the capacitor 28. The wire harness 26 is drawn to the outside of the head part 2 through a hole 6b formed in the center of the shaft 6a.

Connectors (not shown) are attached at the ends of the wire harness 26. These connectors electrically connect the circuits on the substrates, such as the head substrate 60, provided inside the head part 2 to the substrates (control substrates) provided inside the control part 3. Thus, the wire harness 26 electrically connects the electronic parts, such as the xenon tube 52 and capacitor 28, provided in the head part 2 to the control substrates provided in the control part 3.

A spatial domain 35 stores the wire harness 26 in the loosened state. Moreover, a rotor plate 27 is attached at a tip of the shaft 6a of the bounce case 6. The rotor plate 27 has a role that regulates the horizontal rotation of the head part 2 within a predetermined angle range. Moreover, the rotor plate 27 has a role of removal prevention of the head part 2 from the control part 3, and is the connection part between the head part 2 and the control part 3.

Figure 7:
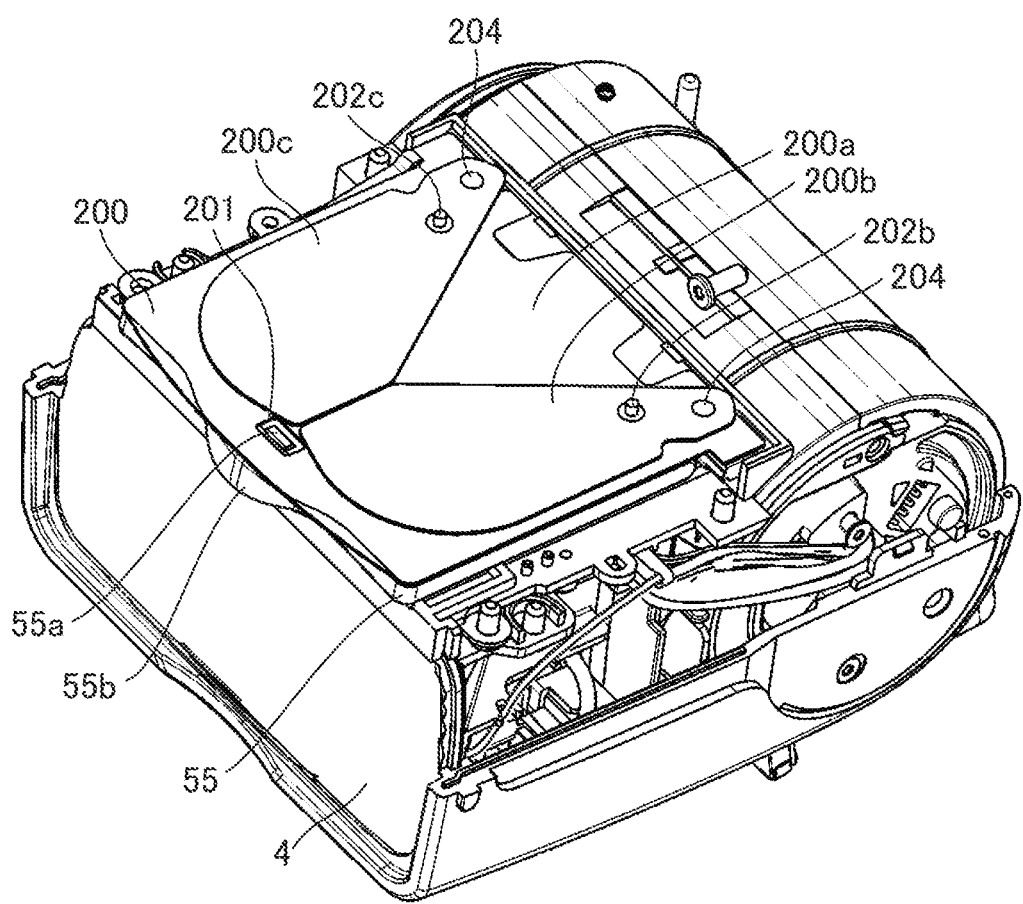
FIG. 7 is an upper perspective view showing the head part.

Next, configurations of the wide panel 55 and the catch light sheet 200 in a retracted state will be described by referring to FIG. 6 and FIG. 7. FIG. 7 is a perspective view showing the inside of the head part 2 in a state where the head upper cover 5 is detached.

As shown in FIG. 6 and FIG. 7, the wide panel 55 and catch light sheet 200 are retracted in a space (retraction part) between the light emission unit 53 and the head upper cover 5. Moreover, the catch light sheet 200 consists of a center catch light sheet 200a, left catch light sheet 200b, and right catch light sheet 200c that are equivalent to an example of a plurality of reflectors of the present invention. Since the left catch light sheet 200b and the right catch light sheet 200c are retracted so as not to overlap mutually, the thickness of the catch light sheet 200 in the retracted state is minimized. Moreover, the left and right catch light sheets 200b and 200c are retracted so that at least one parts thereof may overlap with the center catch light sheet 200a.

A projection 55a provided in the wide panel 55 engages to a hole 201 of the center catch light sheet 200a in the retracted state. The wide panel 55 is an optical element that has light diffusibility for obtaining an irradiation angle wider than that obtained by the movement of the reflection umbrella holder 57. The wide panel 55 is pivotably supported by a wide panel holder 54 and receives energization force in a left turning direction in FIG. 6.

The catch light sheet 200 is a reflective member that reflects a part of the light irradiated from the electronic flash device 1 to the side of the object, and is used in bounce flash photography. Since the light irradiated from the electronic flash device 1 does not directly enter into eyes of a person that is an object in the bounce flash photography, irises of eyes are superficial and slack, which disables to take a picture with lively facial expression.

Generally, when the area of the catch light sheet 200 increases, the area in a person's eye to which the catch light sheet 200 is reflected increases, which enables to take a picture with more lively facial expression. Moreover, since the shape of the catch light sheet 200 is projected on the eye as-is, the shape of the catch light sheet 200 that is the reflective member is preferably circular.

The catch light sheet 200 consists of the three reflectors including the center catch light sheet 200a, left catch light sheet 200b, and right catch light sheet 200c as mentioned above. The left catch light sheet 200b and right catch light sheet 200c are rotatably engaged to the center catch light sheet 200a by resin-made fastening members 204.

A follower 202b and follower 202c are respectively attached to the left catch light sheet 200b and right catch light sheet 200c by fastening. In the first embodiment, the followers 202b and 202c are made from resin. Cam grooves 12b and 12c (FIG. 8A) corresponding to the respective followers 202b and 202c are formed on the inner surface of the head upper cover 5 that is an exterior member. The followers 202b and 202c respectively move along the corresponding cam grooves 12b and 12c.

Figure 8A:
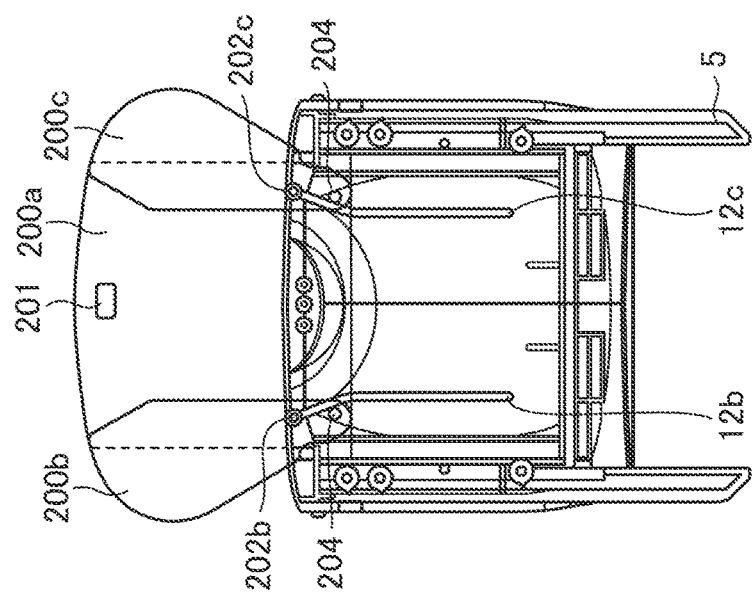
FIG. 8A, FIG. 8B, and FIG. 8C are upper plan views for describing retracting and drawing operations of a catch light sheet to the head part.
Figure 8B:
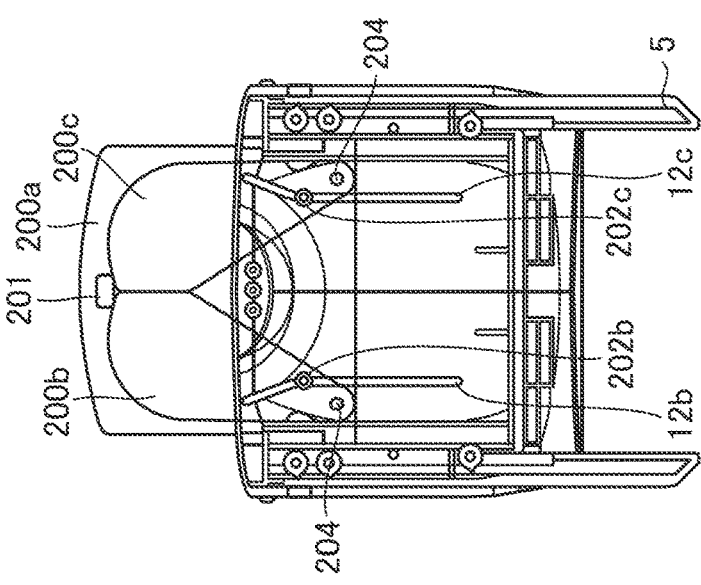
Figure 8C:
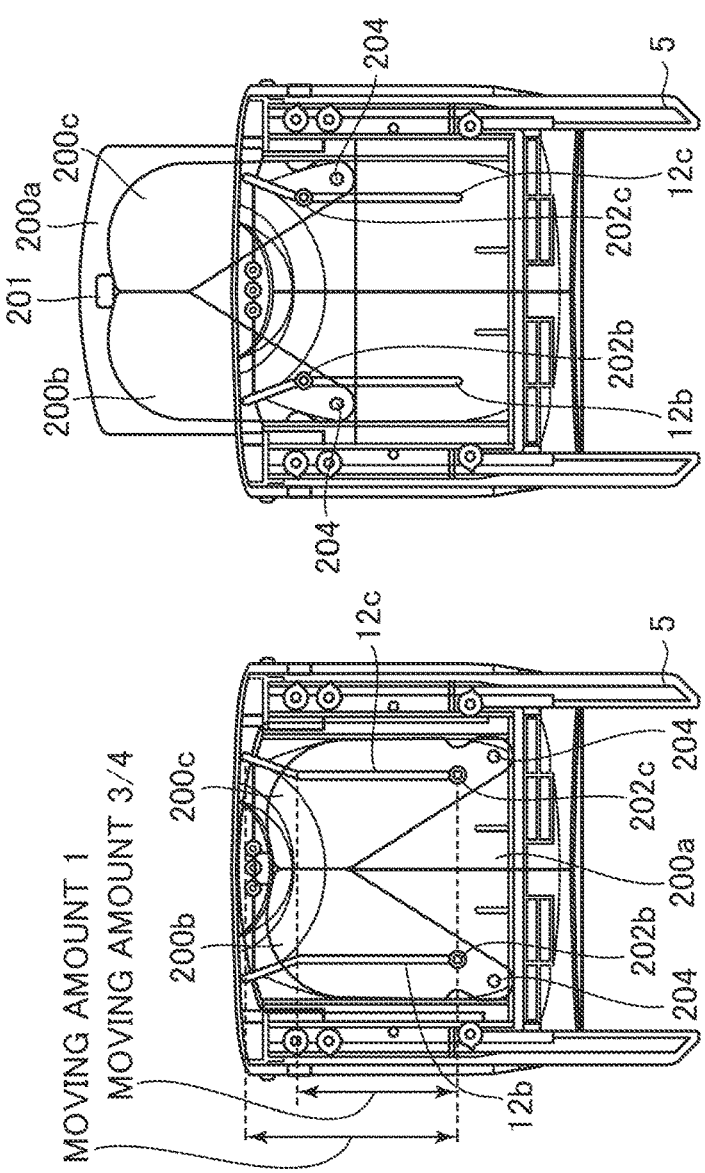

Next, retracting and drawing operations of the catch light sheet 200 to the head part 2 will be described by referring to FIG. 6 and FIG. 8A, FIG. 8B, and FIG. 8C. FIG. 8A FIG. 8B, and FIG. 8C are upper plan views for describing retracting and drawing operations of the catch light sheet 200 to the head part 2. It should be noted that all the components in FIG. 8A, FIG. 8B, and FIG. 8C are illustrated as transparent in order to describe the retracting and drawing operations of the catch light sheet 200 plainly.

As shown in FIG. 6, an insertion opening 203 for retracting and drawing the wide panel 55 and catch light sheet 200 is provided in the head part 2 at the side of the optical panel 4. A drawing knob 55b is provided in the wide panel 55 so as to be project from the insertion opening 203 in a state where the wide panel 55 is retracted.

When the wide panel 55 is used, the wide panel 55 is drawn from the head part 2 by drawing the drawing knob 55b in the irradiation direction of the flash light and is arranged so as to cover the front of the optical panel 4 by the above-mentioned energization force. The center catch light sheet 200a to which the projection 55a of the wide panel 55 engages to the hole 201 is drawn (shifts and moves) at the same time that the wide panel 55 is drawn while an engagement state is maintained.

Moreover, the left catch light sheet 200b and right catch light sheet 200c that are rotatably engaged to the center catch light sheet 200a are also drawn simultaneously. In order to maintain the engagement state, the left catch light sheet 200b and right catch light sheet 200c are set up so that the movement loci thereof may not interfere with the hole 201 of the center catch light sheet 200a.

The above-mentioned followers 202b and 202c are respectively provided in the left catch light sheet 200b and the right catch light sheet 200c. The followers 202b and 202c follow the corresponding cam grooves 12b and 12c according to the drawing of the catch light sheet 200 and develop the left and right catch light sheets 200b and 200c in a fan shape outwardly in the left and right directions of the head part 2.

The cam grooves 12b and 12c of the head upper cover 5 are formed in the same direction as the drawing direction from an initial position of the drawing to a position at which the moving amount is about "¾" when the moving amount for fully developing the catch light sheet 200 is assumed as "1". Moreover, the cam grooves 12b and 12c incline so as to spread to outsides of the head upper cover 5 in the left and right directions from the position at which the moving amount is about "¾" to the position at which the moving amount is "1".

If grooves are formed so as to spread to outsides of the head upper cover 5 in the left and right directions from the initial position of the drawing, the left catch light sheet 200b and right catch light sheet 200c open outwardly (the left and right directions) along the grooves from the initial movement of the drawing and interfere with the head upper cover 5. In order to avoid the interference with the head upper cover 5, the left and right catch light sheets 200b and 200c should be small, which cannot enlarge the area of the catch light sheet 200 that is developed in the fan shape after drawing.

In this way, when the wide panel 55 is drawn, the center catch light sheet 200a, left catch light sheet 200b, and right catch light sheet 200c are drawn ed by following the drawing operation.

As shown in FIG. 8C, when the catch light sheet 200 has developed, the left and right catch light sheets 200b and 200c open with respect to the center catch light sheet 200a in the fan shape. Thereby, the large area of the catch light sheet 200 is securable. When the catch light sheet 200 is developed, the left and right catch light sheets 200b and 200c are partially overlap with the central catch light sheet 200a. This is because the edges of the center catch light sheet 200a are prevented from hitting on the edges of the left and right catch light sheets 200b and 200c when these sheets are retracted in order to enable smooth retracting and drawing operations. However, the overlap areas between the center catch light sheet 200a and the left and right catch light sheets 200b and 200c in the drawn state are smaller than that in the retracted state.

Moreover, the external form of the catch light sheet 200 that opens in the fan shape is so designed that a part becomes approximately circular when viewed from the object side. Moreover, since the catch light sheet 200 at the object side is the reflective member, a big hole and an unnecessary shape are eliminated as much as possible. In the first embodiment, only the hole 201 of the center catch light sheet 200a that engages with the projection 55a appears in the developed state. The engagement parts between the center catch light sheet 200a and the left and right catch light sheets 200b and 200c and the followers remain inside the head part 2 even when the sheets are developed to the fan shape.

This enables to keep the sufficient amount of the reflected light that is emitted from the electronic flash device 1 and is reflected toward an object and enables to take a picture with lively facial expression by entering approximately circular catch light into eyes of a person as the object.

When the wide panel 55 is drawn by the above-mentioned drawing operation, the wide panel 55 is arranged so as to cover the front of the optical panel 4 and the catch light sheet 200 is also drawn. Since the light irradiated from the electronic flash device 1 in this state is diffused by the wide panel 55, the scene where the light amount required for a bounce flash photography runs short occurs.

In this case, it is necessary to retract the wide panel 55 in order to use only the catch light sheet 200. When the wide panel 55 is retracted, although the projection 55a of the wide panel 55 interferes with the center catch light sheet 200a, the retraction becomes available because the center catch light sheet 200a deforms elastically. After that, the catch light sheet 200 is retracted by holding the center catch light sheet 200a and moving in the direction toward the insertion opening 203. Moreover, since the left catch light sheet 200b and right catch light sheet 200c are engaged to the center catch light sheet 200a, they follow the center catch light sheet 200a and are retracted.

A case where only the wide panel 55 is used will be described as a different usage from the above-mentioned case where only the catch light sheet 200 is used. In the state where the wide panel 55 and catch light sheet 200 are drawn by the above-mentioned drawing operation, only the catch light sheet 200 is retracted. In this case, the center catch light sheet 200a and the left and right catch light sheets 200b and 200c are able to be retracted by holding the center catch light sheet 200a and moving in the direction toward the insertion opening 203. After that, the wide panel 55 is retracted to a retracted position because the center catch light sheet 200a deforms elastically by the projection 55a of the wide panel 55.

As described above, the electronic flash device 1 that is able to retract the catch light sheet 200 inside the electronic flash device 1 and to decide the size of the catch light sheet 200 irrespective of the size of the electronic flash device 1 is provided according to the first embodiment.

Although the catch light sheet 200 of the three-sheet configuration including the center catch light sheet 200a, left catch light sheet 200b, and right catch light sheet 200c, is employed in the first embodiment, the same effect will be obtained even when the number of sheets increases.

Next, an electronic flash device as a lighting device according to a second embodiment of the present invention will be described by referring to FIG. 9, FIG. 10A, FIG. 10B, and FIG. 10C. It should be noted that a part in the second embodiment corresponding to a part in the above-mentioned first embodiment is indicated by the same reference numeral and its description is omitted.

Figure 9:
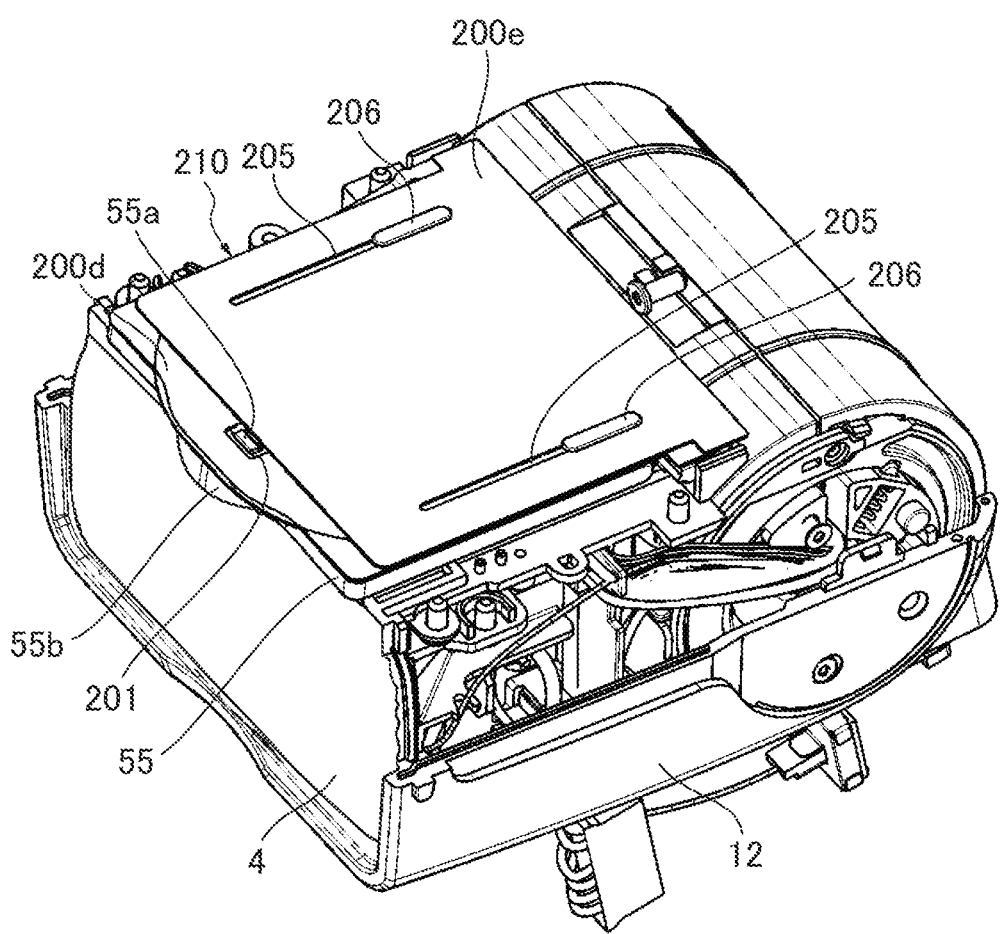
FIG. 9 is an upper perspective view showing of a head part of an electronic flash device as a lighting device according to a second embodiment of the present invention.

Retracted states of the wide panel 55 and a catch light sheet 210 will be described first. FIG. 9 is an upper perspective view showing the head part 2 in a state where the head upper cover 5 is detached.

In the second embodiment, the wide panel 55 and the catch light sheet 210 are retracted in the space between the light emission unit 53 and the head upper cover 5 as with the above-mentioned first embodiment. The configuration of the catch light sheet 210 differs from the catch light sheet 200 of the first embodiment. The catch light sheet 210 consists of a front catch light sheet 200d and rear catch light sheet 200e that are slidable in the drawing direction.

Two slide slots 205 are formed on the rear catch light sheet 200e in a direction parallel to the drawing direction. Fastening members 206 penetrate the slide slots 205 to nip the rear catch light sheet 200e and are fastened to the front catch light sheet 200d. The front catch light sheet 200d slides relatively to the rear catch light sheet 200e in the drawing direction because the fastening members 206 are slidable along the slide slots 205.

Moreover, the fastening members 206 do not only engage the front catch light sheet 200d and rear catch light sheet 200e slidably, but also act as guides for reducing inclination of the front catch light sheet 200d when it is drawn. Accordingly, the fastening members 206 have long shapes in the drawing direction of the catch light sheet 210 to keep length of engagement with the slide slots 205. Moreover, the catch light sheet 210 is retracted in a state where the projection 55a of the wide panel 55 is engaged to the hole 201 of the front catch light sheet 200d as with the first embodiment.

Next, retracting and drawing operations of the catch light sheet 210 will be described by referring to FIG. 9 and FIG. 10A, FIG. 10B, and FIG. 10C. FIG. 10A, FIG. 10B, and FIG. 10C are upper plan views for describing retracting and drawing operations of the catch light sheet 210 to the head part 2. It should be noted that all the components in FIG. 10A, FIG. 10B, and FIG. 10C are illustrated as transparent in order to describe the retracting and drawing operations of the catch light sheet 210 plainly.

When the catch light sheet 210 is drawn, the drawing knob 55b of the wide panel 55 is held and drawn in the irradiation direction of the light source in the same manner as the above-mentioned first embodiment, which draws the front catch light sheet 200d that engages with the projection 55a.

Simultaneously, the fastening members 206 move along the slide slots 205. After the fastening members 206 run against the ends of the slide slots 205, the rear catch light sheet 200e is drawn by following the front catch light sheet 200d as shown in FIG. 10B. When the front catch light sheet 200d is held and drawn in the irradiation direction of the light source from the state shown in FIG. 10B, the rear catch light sheet 200e is fully drawn from the head part 2 as shown in FIG. 10C. In the state shows in FIG. 10C, a part of catch light sheet 210 is approximately circular.

In the above-mentioned first embodiment, the catch light sheet 200 develops in the right and left direction to keep a large area. In the second embodiment, the same effect is obtained by developing the catch light sheet 210 in the drawing direction that is the irradiation direction of the light source. Moreover, although the catch light sheet 210 of the two-sheet configuration including the front catch light sheet 200d and rear catch light sheet 200e is employed in the second embodiment, the same effect will be obtained even when the number of sheets increases. The other configurations and operation effects are the same as that of the above-mentioned first embodiment.

It should be noted that the present invention is not limited to what has been described with the above-mentioned embodiments, quality of the material, a shape, a size, a formation, the number of elements, arrangement locations, etc., can be changed suitably unless it is deviated from the scope of the present invention.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-004351, filed Jan. 15, 2018, which is hereby incorporated by reference herein in its entirety.

What is claimed is:

1. A lighting device comprising:
a light emitting section; and
a reflective member that is drawably retracted in the light emitting section and is provided with reflectors that are deployed by a drawing operation to reflect a part of light irradiated from the light emitting section so that area of the reflectors in a deployed state will be more than area of the reflectors in a retracted state.

2. The lighting device according to claim 1, wherein the reflectors are rotatably engaged.

3. The lighting device according to claim 1, wherein the reflective member comprises a center reflector and left and right reflectors arranged at left and right of the center reflector so that the left and right reflectors may not overlap mutually from the retracted state to a state where the reflectors are deployed by the drawing operation.

4. The lighting device according to claim 3, wherein each of the left and right reflectors has a follower that moves along a cam groove formed in an exterior member.

5. The lighting device according to claim 1, wherein the reflective member has a part of which a contour shape becomes approximately circular in the deployed state.

6. The lighting device according to claim 1, wherein the reflectors are engaged so as to allow slide operations and deploy in parallel to a drawing direction by the drawing operation.

7. An image pickup apparatus comprising:
an image pickup unit configured to pick up an image of an object: and
a lighting device comprising:
a light emitting section that irradiate the object; and
a reflective member that is drawably retracted in the light emitting section and is provided with reflectors that are deployed by a drawing operation to reflect a part of light irradiated from the light emitting section so that area of the reflectors in a deployed state will be more than area of the reflectors in a retracted state.

8. A lighting device comprising:
a light emitting section; and
a reflective member that has a first reflector and a second reflector that are retractable in a retraction part provided in the light emitting section and reflects a part of light irradiated from the light emitting section by the first reflector and the second reflector that have been drawn from the retraction part, wherein the first reflector and the second reflector are retracted in the retraction part in a state where the first reflector at least partially overlaps with the second reflector, wherein the second reflector is drawn from the retraction part in connection with shift movement of the first reflector in a direction in which the first reflector is drawn from the retraction part, and wherein overlap area between the first reflector and the second reflector in a state where the first reflector and the second reflector have been drawn from the retraction part is smaller than the overlap area in a state where the first reflector and the second reflector are retracted in the retraction part.

9. The lighting device according to claim 8, wherein a cam groove is formed in the retraction part and a follower that moves along the cam groove is formed in the second reflector.

10. The lighting device according to claim 8, wherein the reflective member has a part of which a contour shape becomes approximately circular in the state where the first reflector and the second reflector have been drawn from the retraction part.

\* \* \* \* \*